A. G. Hull,
Planing and Matching Machine.
Nº 385.
2 Sheets—Sheet 2.
Patented Sep. 20, 1837.
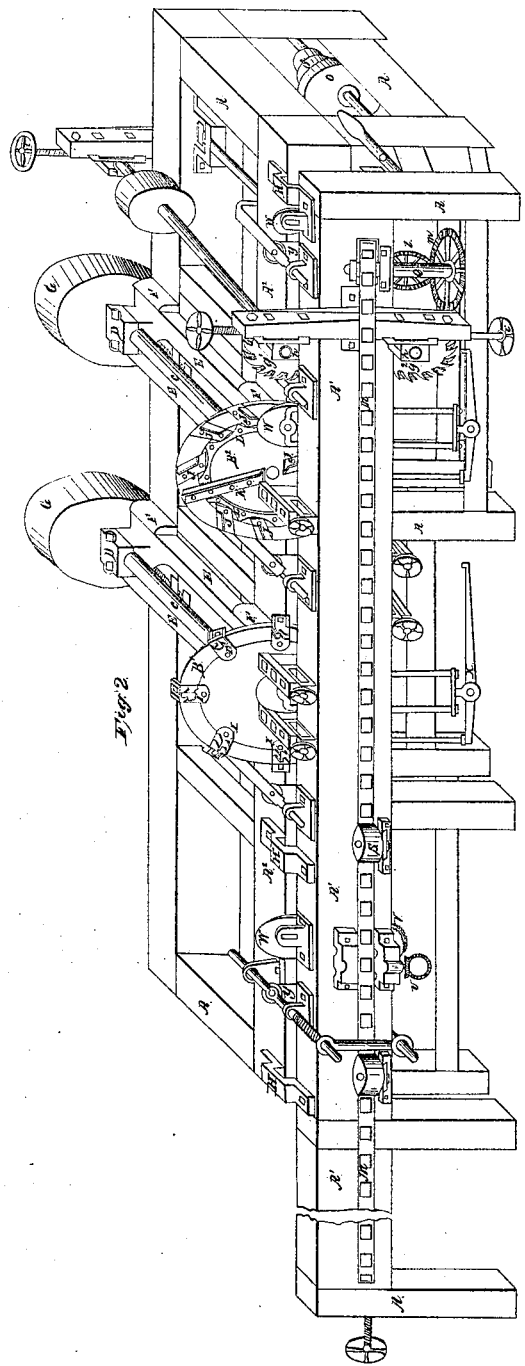

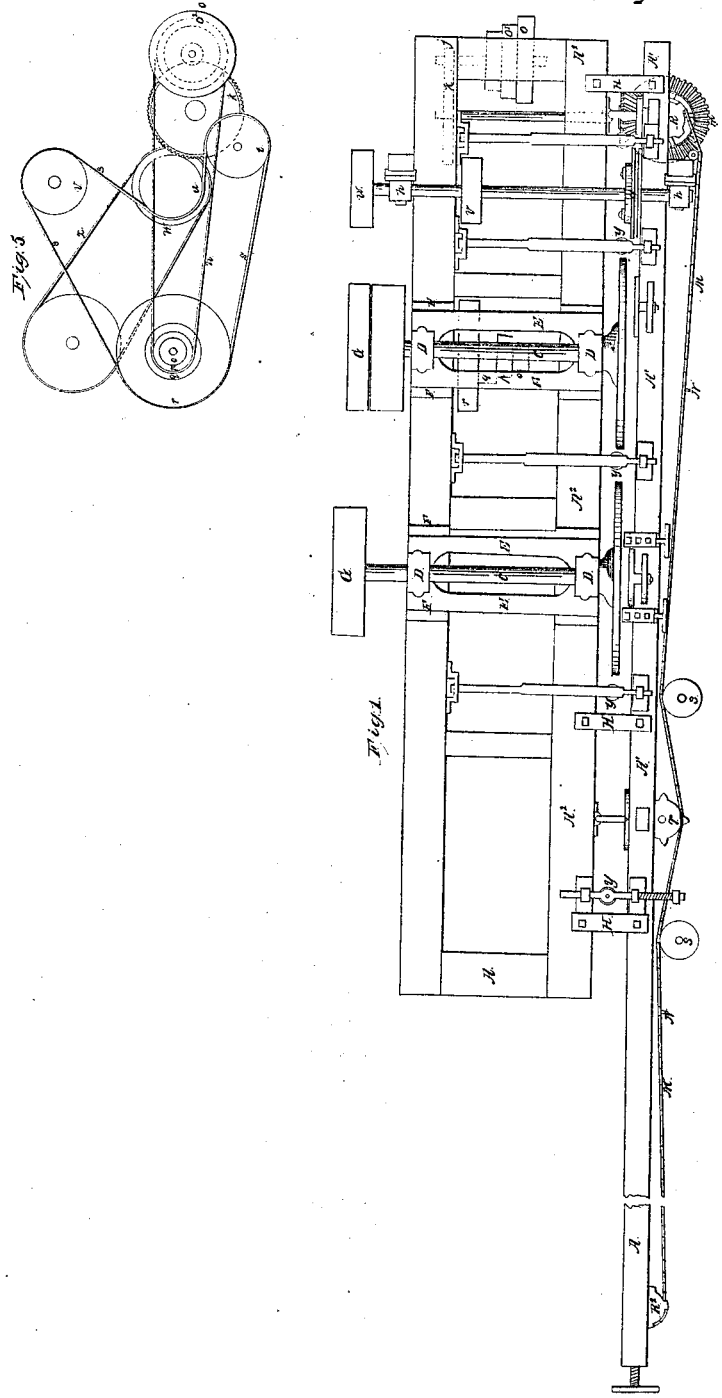

A. G. Hull,
Planing and Matching Machine.
No. 385.
Patented Sep. 20, 1837.
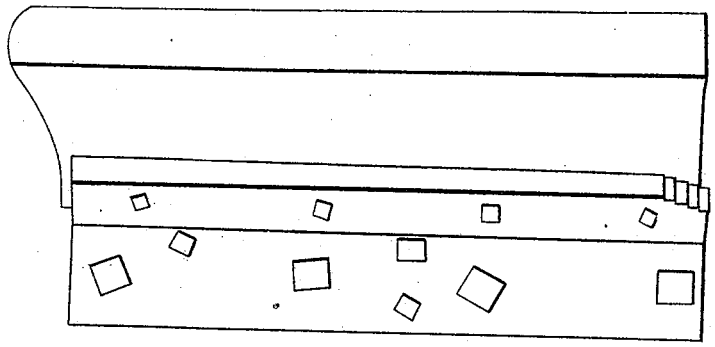
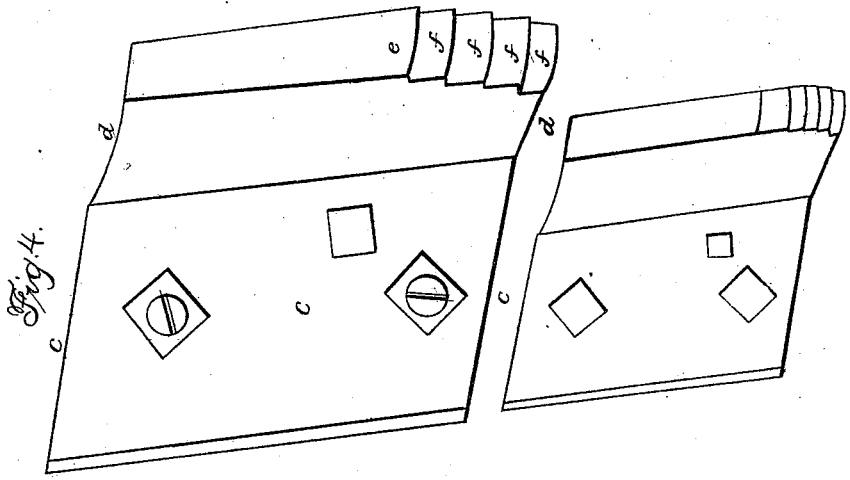
Fig. 4.
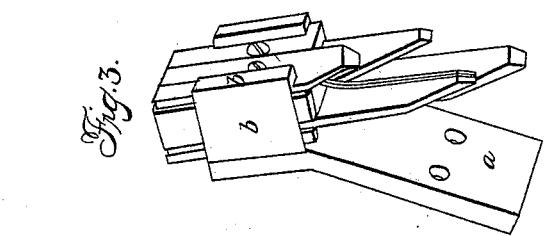
Fig. 3.

UNITED STATES PATENT OFFICE.

ALONZO G. HULL, OF BROOKLYN, NEW YORK.

PLANING-MACHINE.

Specification of Letters Patent No. 385, dated September 20, 1837.

*To all whom it may concern:*

Be it known that I, ALONZO G. HULL, of the city of Brooklyn, in the State of New York, have invented an Improved Planing-Machine; and I do hereby declare that the following is a full and exact description thereof, reference being had to the drawings which accompany and make a part of this specification.

The planing in this machine is effected by revolving cutters, placed on the faces of circular disks or face-plates, affixed to horizontal shafts; the boards or other stuff to be planed standing edgewise against the faces of the revolving disks, and being forced forward by an endless chain passing around suitable drums, or chain wheels, and supported and guided by rollers, in a way to be presently described.

Figure 1, in the accompanying drawing, represents a top view of the machine; and Fig. 2 shows the same in perspective; and in both these figures the same letters of reference are employed to designate the same parts.

In describing this machine, I shall, in some cases, give particular dimensions; but this I do merely as a general guide, and to show that I have found to answer well in practice—but it will be evident to every one acquainted with machinery, that much latitude may be taken in this particular, while the general principle or mode of operation of the machine will remain unchanged.

A A A is the frame of the machine, which may be of 8 by 10 inch timber; the principal frame which sustains most of the machinery is 15 feet long—but the front plate or shear A′, A′, is extended to double that length, to support the plank, the endless chain, guide rollers, &c. Between the front shear, or shear A′, and the shear or plate A², there is a space of 6 or 8 inches, within which the planing disks or face-plates revolve, and the board or stuff to be planed is made to pass.

B B are the planing disks, or face-plates, which are of cast iron, three feet in diameter and one inch thick—but they are thickened out on their backs to afford the requisite stability, where they are attached to their shafts, C C. The whole length of these shafts is three feet, nine inches. The plumber blocks D D in which they run, are three feet apart, from out to out. The shafts are three and a quarter inches, and their necks or bearings three inches in diameter.

E E are cast iron frames which support the plumber blocks and shafts; they are three feet long, fourteen inches wide, and two in thickness. They rest securely in cast iron bed pieces F F, let into the frame and secured by screws. Adjusting screws may be passed through the pieces F F, and bear against the sides of the frames E E— the frames, also, are furnished with adjusting screws passing through slots, by means of which the face plates may be advanced or moved back, according to the thickness of the stuff to be planed.

G G are whirls, by means of which the shafts and face plates may be made to revolve. It may be found convenient, for some purposes, to employ three face-plates with their cutters, and other appendages; but in general, and probably always, two, properly constructed, will answer every purpose required.

H H are hold-fasts of cast or of wrought iron, firmly bolted to the two front shears A′, and A², crossing the space in which the face-plates revolve, and along which the stuff passes which is being planed. Toward the floor, these two parts of the frame may be united by framed girths, or otherwise.

The face-wheel B′, which I call the reducing wheel, carries the cutters near its periphery, which operate as jack planes, serving to reduce the stuff to a thickness, and to this the stuff is first fed; it passes thence to the second face wheel B², called the smoothing wheel, the cutters upon which operate as fore and smoothing planes, leaving the stuff in a finished state. For a width of four inches, measuring from the periphery of the face wheels toward the center, they are thickened up about one fourth of an inch, which admits of the more convenient facing of the shanks of the cutters, and of giving a proper face to the wheels. On the reducing wheel, I make nine, or any other convenient number of excavations, three inches wide, and one fourth of an inch deep, in the raised part of the face, bringing them even, or nearly so, with the general face of the wheel— which spaces, are to receive the shanks of the reducing cutters, these being affixed to the wheel by making the edges of the shank or stock to fit into dove-tailed grooves, and by a screw-bolt; or in any other manner equally efficient. I I I are the reducing cutters, and their shanks.

Figs. 3 and 4, represent two different modes in which I construct and apply the reducing cutters—in which figures they are drawn on a larger scale than in the general drawing, the purpose of exhibiting them more distinctly. In the actual machine, the stock in Fig. 3 is seven inches long, three wide, and half an inch thick. The part $a$, is that by which it is attached to the reducing wheel; and the part $b$, that which receives the cutters: This clasp or socket, part $b$, projects beyond the periphery of the wheel, and inclines back at an angle of twenty degrees, more or less, in order to present properly the edges of the cutters to the stuff to be planed. The cutters in each stock are usually four in number, and they are held in their places in the socket or clasp $b$, by means of screws, or in any secure manner. They have shoulders also, on one side, which bear against the socket and prevent them flying out by the rapidity of their motion. They are ground at their cutting edges to such a bevel as adapts them to the purpose intended—and are so arranged as to cut in advance of each other, and to different depths; the cutting edge of each stands at an angle of about forty five degrees with its side.

In Fig. 4, another kind of reducing cutter is represented; and one that from its simplicity and efficiency, may, probably, be preferred to the combined cutters last described—as, in this, the stock and sucessive cutters, may constitute one single piece of metal. The flat part $c$, is that by which it is attached to the reducing wheel; from this the part $d$, rises, at a suitable angle say of forty five degrees; its upper side $e$, which forms the cutting edge, being made of steel—and the general direction of the edge, stands at an angle of forty-five degrees with the radii of the wheel. $fff$, are off-sets, or steps, made in this steel face—so that each off-set forms a sharp cutting point—each usually declining from about one sixteenth to one eighth of an inch in succession. This cutter is sharpened by grinding it on the beveled surface which is opposite to $d$—the junction of which with the face, or upper side $e$, forms the cutting edge.

The face-wheel $B^2$, Fig. 2, has also, usually nine cutters J J J, around its periphery which are formed much like the cutter Fig. 4, with its offsets—and the board is reduced $\frac{1}{16}$th or $\frac{1}{8}$th by these cutters. The general edge of each of these cutters, is parallel with the stuff to be planed—but is a little reduced at the forward points by the off-sets, that it may remove smoothly. They are usually double-ironed; and their edges form an angle of about forty five degrees with the radii of the wheel. Besides these nine short cutters on the face wheel, near its periphery, I use two long knives or cutters K K, which may be each fifteen inches long; they are to be longer in all cases than the width of the stuff to be planed, as they are designed to remove every inequality which may be left by the shorter cutters; their cutting edges stand in the direction of the radii of the wheel, forming an angle with its face of $\frac{1}{16}$th or $\frac{1}{8}$th of an inch, the point being nearest the face; and they are directly opposite to each other. Their fore ends extend out to the same distance with that of the short cutters; where, like them, they have off-sets, say to the distance of half an inch or so, that they may enter and remove smoothly the stuff. Like the short cutters on this wheel they also should be, and generally are double-ironed, excepting at the reduced half inch for entering and each cutter has a set-screw, to set it with. Both face-wheels have a trifling cant of their axes, to enable the cutters to pass clear of the stuff on the side of the wheel opposite to that on which the cutting is to be effected; and to make the long cutters finish when nearly at right angles with the board. L L, are smooth plates, screwed on to the face-plates of the smoothing wheel, to bear against the stuff which is being planed—and which plates rise to a height nearly equal to that of the cutters, so as to answer the purpose of the sole, or face, of an ordinary plane, regulating the thickness of the shaving to be removed. These plates may be made either of wood, or of metal; they may be in two pieces only each being nearly a semi-circle on its inner edge, but scalloped on its outer, to embrace, in part, the cutters J J. To prevent choking, they terminate, forming an open throat, at a small distance from the cutting edges of the long cutters K K.

The stuff to be planed is as before remarked, fed in edgewise, between the front timber $A^1$, $A^1$, of the frame, and the planing disks $B^1$, $B^2$, and is carried forward by the endless revolving chain M M, which has on it projecting dogs or catches N N that bear against the ends of the boards.

O, is a bandwheel, to which the power may be applied that is to carry the endless chain, its shaft being geared to the shaft P; and this, by bevel-gear, to the vertical shaft Q; having, on the upper end of it, the chain-wheel $R^1$, the cogs of which take into the hollow links of the chain, and cause it to revolve.

$R^2$, is a tightening wheel, having a screw attached to its sliding frame, by which the tension of the chain is regulated.

S S are friction-rollers, to press the chain, and keep it in its place.

T is a cog wheel, driven by the chain; the shaft of which, by bevel-gear U, drives a cog or point wheel, V, the face of which bears against the lower edge of the board, and by its points, or sharp teeth, prevents it from slipping so as to advance too rapidly upon the cutters. The lower edge of the board rests upon a ledge on the inside of the frame $A^1$, and its upper edge is pressed upon by friction-rollers W W, which are borne down by weighted levers X X, operating on a sliding frame, in the upper end of which the rollers revolve. Y Y Y are vertical rollers, which press upon the face of the board, and keep it against the frame; these rollers may be borne up in various ways, as by weighted levers, springs, or otherwise. The slides Z sustain similar rollers, but smaller, as they operate nearly on contact with the cutters.

When the boards are to be jointed, or to be tongued and grooved, the revolving cutters $g^1$, $g^2$, properly formed, are used for that purpose. The gudgeons of the shafts on which these are placed revolve in sliding boxes h h, at each of their ends, and are adapted to the edges of the board, by the set-screws i i.

I do not intend to confine myself to any particular arrangement of the wheels, bands, and gearing used by me, as these may be varied indefinitely without interfering with the general mode of action in this machine, or with the ends attained by it. In Fig. 5, however, and in parts of Figs. 1 and 2, I have shown the mode which I have essayed and have found to operate well.

O, (Figs. 1, 2, and 5,) is the first driving wheel; j, a pinion on its shaft, meshing into the toothed wheel k, on the fore end of which shaft is a bevel pinion l, Figs. 1 and 2, which drives the bevel wheel m, and its vertical shaft Q, carrying, at its upper end, the chain wheel $R^1$.

n, is a band from one of the offsets on the whirl O, say $O^2$, passing round the offset p, on an independent or guide whirl, o, p, q, r.

s, is a band around the outside of the latter whirl, and around a guide wheel t, whence it passes around wheels u and v on the shafts of the tongue-and-groove wheels, or cutters. w, a whirl on the back end of the shaft of the lower tongue-and-groove cutter, a band x, from which passes around $G^2$, a whirl on the shaft $C^2$, of the face-wheel $B^2$.

Having thus fully described the manner in which I construct my machine for planing, tonguing, and grooving, or jointing boards, I do hereby declare, that I do not claim to be the inventor of face wheels, provided with cutters, and running vertically, for planing boards, nor of cutter wheels for jointing and tonguing and grooving; nor of the application of an endless chain to the feeding of the boards to planes or cutters; nor of various other parts of this machine, as described by me, taken unconnectedly and individually, but

1. I do claim to be the inventor of the manner of combining these parts together, substantially in the manner herein set forth; and, specifically.

2. I claim the combination of two or more face-wheels, carrying cutters on the first wheel for reducing and on the subsequent wheel or wheels for smoothing or finishing the stuff operated upon.

3. I claim, likewise, the first and second modes of constructing the cutters on the reducing wheel, as shown in Figs. 3 and 4, that is to say, the manner of connecting and using the four or other convenient number of cutters set in one stock, cutting to different depths, and in advance of each other; and also, the single cutter, with off-sets, constructing and operating in the way described.

4. I also claim, in the smoothing wheel, the combination of the long radiating cutters or knives, and the setting of them at an angle with the face-plate, with the shorter cutters near the periphery, and the semi-circular or other face-plates for determining the thickness of the shaving on the smoothing wheel.

And I do hereby declare that I do not intend to limit myself, by any thing herein set forth, to any precise form or particular arrangement of the parts described; but to vary these as I may think proper, while I attain the same ends, by means substantially the same.

ALONZO G. HULL.

Witnesses:
JAMES HOPSON,
WM. CALLINDER, Jr.